US008539477B2

(12) United States Patent
Balascio et al.

(10) Patent No.: US 8,539,477 B2
(45) Date of Patent: Sep. 17, 2013

(54) MANAGED ENVIRONMENT UPDATE SELECTION

(75) Inventors: Tyron M. Balascio, Monroe, WA (US); Sumeet S. Solanki, Philadelphia, PA (US); Antonio Wong, Redmond, WA (US); Stephanie A. Drenchen, Kenmore, WA (US)

(73) Assignee: Microsoft Corporation, Redmond, WA (US)

( * ) Notice: Subject to any disclaimer, the term of this patent is extended or adjusted under 35 U.S.C. 154(b) by 872 days.

(21) Appl. No.: 12/391,265

(22) Filed: Feb. 24, 2009

(65) Prior Publication Data

US 2010/0218179 A1  Aug. 26, 2010

(51) Int. Cl.
G06F 9/445 (2006.01)

(52) U.S. Cl.
USPC ............ 717/171; 717/170; 717/176; 717/177

(58) Field of Classification Search
None
See application file for complete search history.

(56) References Cited

U.S. PATENT DOCUMENTS

| | | | |
|---|---|---|---|
| 6,151,643 A | 11/2000 | Cheng et al. | |
| 6,968,550 B2 | 11/2005 | Branson et al. | |
| 7,171,660 B2 | 1/2007 | McCaleb et al. | |
| 2004/0003390 A1* | 1/2004 | Canter et al. | 717/178 |
| 2004/0044999 A1* | 3/2004 | Gibson | 717/178 |
| 2005/0132382 A1 | 6/2005 | McGuire et al. | |
| 2005/0257214 A1* | 11/2005 | Moshir et al. | 717/171 |
| 2007/0157192 A1 | 7/2007 | Hoefler et al. | |
| 2007/0169079 A1 | 7/2007 | Keller et al. | |
| 2008/0163092 A1 | 7/2008 | Rao | |
| 2008/0201465 A1 | 8/2008 | Jones et al. | |
| 2008/0301667 A1 | 12/2008 | Rao et al. | |

OTHER PUBLICATIONS

"Windows Update, Microsoft Update, and Automatic Updates for IT Professionals", Retrieved at <<http://technet.microsoft.com/en-us/updatemanagement/bb259683.aspx>>, Dec. 19, 2008, pp. 3.
"Connected Platform Update Service", Retrieved at <<http://www.macrovision.com/products/ce_manufacturers/connected_platform/software_update_service.htm?tabContent=/products/ce_manufacturers/connected$_{13}$ platform/software_update_service/overview_8919.htm>>, Dec. 19, 2008, p. 1.
"Software Update Services Overview", Retrieved at <<http://www.ku.edu.tr/files/cit/publications/SUSOverview.pdf>>, Jun. 2002, pp. 27.
Pawlak, Peter, "Free Software Update Technology to Cover All Products", Retrieved at http://www.directionsonmicrosoft.com/sample/DOMIS/update/2005/02feb/0205fsuttc.htm>>, Jan. 24, 2005, pp. 6.

* cited by examiner

Primary Examiner — Chuck Kendall
(74) Attorney, Agent, or Firm — Jared S. Goff

(57) ABSTRACT

Software update selection information can be obtained for each of multiple machines in a managed environment. The update selection information for each machine can represent selections of software updates corresponding to software installed on the machine. The software update selection information for the machines can be aggregated to produce aggregated software update selection information. In addition, the aggregated software update selection information can be used to produce a subscription set of software update selections corresponding to software to update on the machines. The subscription set can exclude available software update selections that do not correspond to software installed on the machines.

20 Claims, 9 Drawing Sheets

500

```
<Discovery ID="Microsoft.SystemCenter.WsusCategoryGuid.Discovery"
  Enabled="true" Target="SC!Microsoft.SystemCenter.ManagedComputer">
  <Category>Discovery</Category>
  <DiscoveryTypes>
    <DiscoveryClass TypeID="Microsoft.SystemCenter.WsusCategoryGuid">
      <Property PropertyID="Guid" />
    </DiscoveryClass>
    <DiscoveryRelationship
      TypeID="Microsoft.SystemCenter.WsusCategoryGuidRelationship" />
  </DiscoveryTypes>
  <DataSource ID="DS"
    TypeID="Windows!Microsoft.Windows.TimedScript.DiscoveryProvider"
    RunAs="System!System.PrivilegedMonitoringAccount">
    <IntervalSeconds>10800</IntervalSeconds>
    <SyncTime />
    <ScriptName>Microsoft.SystemCenter.AutoSelect.vbs</ScriptName>
```

```
Do
    set searchResult = DoSearch(1)
    if searchResult is Nothing Then
        momAPI.LogScriptEvent "Autoselect.vbs", 0, 1, "Err.Number: " &
Err.Number
        WScript.Sleep 30000
        retryCount = retryCount + 1
    Else
        Exit Do
    End If
Loop While retryCount < retryLimit - 1 if searchResult is Nothing Then
    set searchResult = DoSearch(0)
End If

Dim discoveryData
Dim rootCategories
Dim rootCategory
Dim index
```

610
```
set discoveryData = momAPI.CreateDiscoveryData(0, sourceId,
managedEntityId)

set rootCategories = searchResult.RootCategories
For index = 0 To rootCategories.Count-1
    Set rootCategory = rootCategories.Item(index)
    AddInstance discoveryData, rootCategory RootCategories_Recursive discoveryData, rootCategory
Next Call momAPI.Return(discoveryData)
```

```
Function RootCategories_Recursive(discoveryData, parentCategory)
    Dim childrenCategories
    Dim category
    Dim index set childrenCategories = parentCategory.Children
    For index = 0 To childrenCategories.Count-1
        Set category = childrenCategories.Item(index)
        AddInstance discoveryData, category
        RootCategories_Recursive discoveryData, category
    Next
End Function
```

```
Function DoSearch(canRetry)
   Dim updateSession
   Dim updateSearcher
   Dim result Set updateSession = CreateObject("Microsoft.Update.Session")
   Set updateSearcher = updateSession.CreateUpdateSearcher()

if canRetry = 1 Then
      On Error Resume Next
   End If

Set result = updateSearcher.Search("Type='Software' or Type='Driver'")

if canRetry = 1 Then
      If Err.Number <> 0 Then
         Set result = Nothing
      End If
      On Error Goto 0
   End If
   set DoSearch=result
End Function
```

Figure 7

MANAGED ENVIRONMENT UPDATE SELECTION

COPYRIGHT NOTICE AND PERMISSION

A portion of the disclosure of the patent document may contain material that is subject to copyright protection. The copyright owner has no objection to the facsimile reproduction by anyone of the patent document or the patent disclosure, as it appears in the patent and trademark office patent files or records, but otherwise reserves all copyright rights whatsoever. The following notice shall apply to this document: Copyright© 2009, Microsoft Corporation.

BACKGROUND

In a managed environment, updates for one or more managed machines can be managed by one or more managing machines, and often by a single managing machine. As used herein, machines can be physical or virtual computing machines or other computing configurations that can be updated in a manner similar to physical or virtual machines. As an example, the managing and managed machines can be running server and client components of computing environment management software, such as Microsoft's System Center Essentials information technology (IT) systems management software.

As used herein, a managed environment is an environment where one or more managing machines manage updates for one or more managed machines. The managing machine(s) can also manage other aspects of the managed machines, or such other aspects could be managed by one or more other machines. The managed machines can operate as one or more of many different types of machines in computing environments, such as server machines, client machines, peer machines, etc.

In a managed environment, a user (often an IT professional) typically manually selects from a product list those software products for which updates will be obtained for the environment. The product list can contain a large number of product areas (such as Microsoft's Windows® operating system, Microsoft's Office productivity software, etc.) and specific products and/or product versions in each area (such as Windows® XP operating system with service pack 2). To select the products, the user typically manually reviews software usage patterns in the environment and decides the products for which to obtain updates. The user can then enter update selections by entering appropriate settings in update management software, such as Microsoft's Windows® Server Update Services software.

Update categories corresponding to the selections can then be obtained from an update source, such as the Microsoft Update software update source. Update categories can include software updates that apply to particular software companies, software products, groups of software products, and/or versions of software products. The update categories can include one or more human language versions (English, French, Japanese, etc.) of the updates, which can be provided as specified in the software update selection settings.

SUMMARY

Whatever the advantages of previous managed environment updating tools and techniques, they have neither recognized the updating tools and techniques described and claimed herein, nor the advantages produced by such tools and techniques.

In one embodiment of the tools and techniques, software update selection information can be obtained for each of multiple machines in a managed environment. The update selection information for each machine can represent selections of software updates corresponding to software installed on the machine. The software update selection information for the machines can be aggregated to produce aggregated software update selection information. In addition, the aggregated software update selection information can be used to produce a subscription set of software update selections corresponding to software to update on the machines. The subscription set can exclude available software update selections that do not correspond to software installed on the machines.

In another embodiment of the tools and techniques, managed machine software update selection indications can be produced for each of a plurality of managed machines in a managed environment. The software update selection indications for each managed machine can indicate software update selections corresponding to software installed on the managed machine. The managed machine software update selection indications for the plurality of managed machines can be aggregated to produce aggregated software update selection indications. Additionally, the aggregated software update selection indications can be used to request available updates corresponding to the aggregated software update selection indications.

In yet another embodiment of the tools and techniques, one or more software products installed on each of a plurality of machines in a managed environment are identified. The one or more software products can correspond to one or more software update selections, and one or more indications of the software update selections can be produced. The software update selections for each of the machines can be aggregated. In addition, available software updates corresponding to the software update selections can be obtained.

This Summary is provided to introduce a selection of concepts in a simplified form. The concepts are further described below in the Detailed Description. This Summary is not intended to identify key features or essential features of the claimed subject matter, nor is it intended to be used to limit the scope of the claimed subject matter. Similarly, the invention is not limited to implementations that address the particular techniques, tools, environments, disadvantages, or advantages discussed in the Background, the Detailed Description, or the attached drawings.

BRIEF DESCRIPTION OF THE DRAWINGS

FIG. 5 is a listing of XML language for invoking a software update selection script on managed machines.

FIG. 6 is a listing of VBScript discovery script code for discovering software update selection information from a machine.

FIG. 7 is a listing of VBScript search script code for gathering update selection information about installed software on a machine.

DETAILED DESCRIPTION

Figure 1:
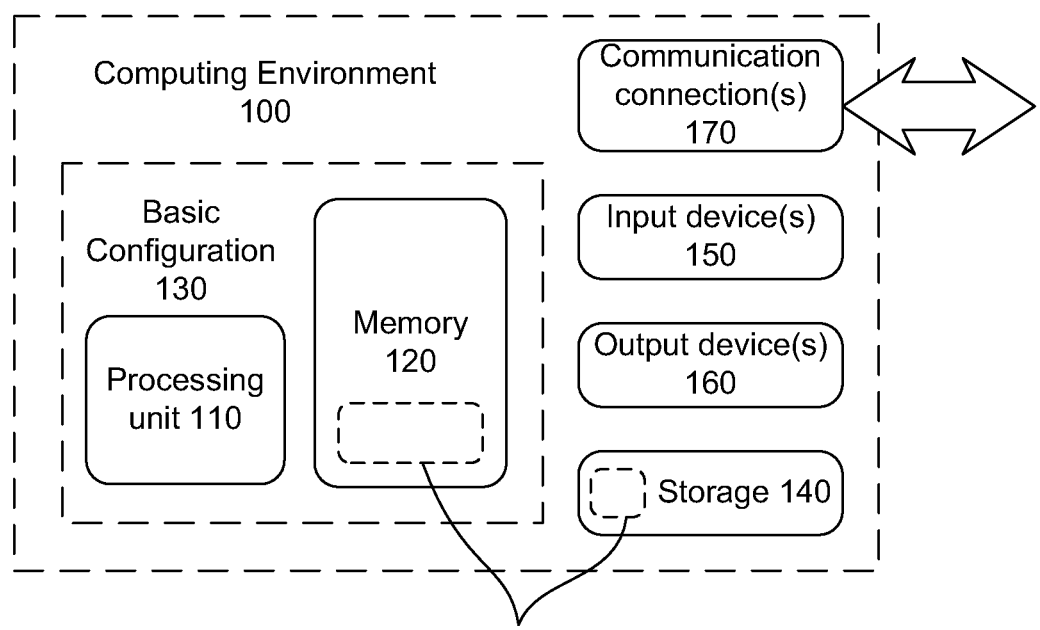
FIG. 1 is a block diagram of a suitable computing environment in which one or more of the described embodiments may be implemented.

Described embodiments are directed to techniques and tools for improved selection of updates in a managed updating environment. Such improvements may result from the use of various techniques and tools separately or in combination.

Such techniques and tools may include obtaining information on software update selections for selecting one or more pertinent software update categories for one or more managed machines. The software update selection information can include information on different software products to be updated. The update selection information can be used to obtain software update categories corresponding to software installed on machines in the managed environment, and it can be used to avoid obtaining software update categories that do not correspond to software installed on machines in the managed environment. This selection of updates can be done automatically, such as periodically according to one or more schedules.

For example, the update selection information for each of the one or more managed machines can be obtained and aggregated, and the resulting aggregated update selection information can be used to request the appropriate update categories for a managed environment. Aggregation includes bringing together and organizing the update selection information for the managed machines so that the update selection information for the managed machines in the managed environment can be used together as a whole. For example, this can include eliminating duplicate update selection information, where the update selection information for multiple managed machines overlaps. In one embodiment, the update selection information for each individual machine in the managed environment (which can include one or more managing machines in addition to one or more managed machines) can be represented in a corresponding machine manifest. Moreover, aggregated update selection information for all the machines in the managed environment can be represented in a managed environment subscription set. The managed environment subscription set can be used to request appropriate update categories from an update source.

The terms manifest and subscription set are used herein broadly to include sets of software update selection information, regardless of the format of that information (e.g., in a single file, in multiple files, etc.). A subscription set refers to a set of software update selection information (such as indications of software update categories) for a managed environment, while a manifest refers to such information for a single machine.

As used herein, update categories refer broadly to categories of software updates, which are typically delivered in a package from an update source. In addition to information on such update categories, software update selection information can include other pertinent information for software update selections in a managed environment. Thus, appropriate software update categories may be automatically obtained using the software update selection information.

Currently, software products to update in a managed environment are selected manually. This manual selection can be an arduous task, given the number of machines (often hundreds) in many managed environments. Thus, it is often a prohibitively time-consuming to actually check the software products installed on each particular machine. Users, such as IT professionals, may generate reports of installed software in a managed environment using existing system management software, such as Microsoft's System Center Essentials software. However, such reports may not provide all the information a user needs to select only those update categories that correspond to installed software in a managed environment. For example, such a report may not indicate whether a specific service pack is installed on a machine, while update categories may correspond to software with specific service packs installed. Thus, a user may not manually request all the service pack categories corresponding to the software installed in the managed environment, thereby potentially missing important updates. To avoid this, a user may request categories applying to all service packs for any installed software, but that can require added work for the managing machine and the user in dealing with unnecessary software update categories.

Because of such limitations and the work involved in manually monitoring software usage and selecting software products to update, users struggle to obtain all the desired updates for a managed environment and to deal with undesired updates. When users obtain too few update categories for a managed environment, then parts of their managed environment can be out of date and possibly unsecure. When users obtain too many update categories, they place extra burdens on themselves and their managing machines.

As noted above, with existing manual software update selection techniques for managed environments, machines and users can be overburdened by too many software updates or left unsecure because of missing software updates for installed software. The tools and techniques described herein can be beneficial in allowing the correct software updates to be selected and obtained without overburdening users and managed environments. Indeed, in some embodiments it can allow the appropriate updates for a managed environment to be selected and obtained automatically according to one or more schedules.

The subject matter defined in the appended claims is not necessarily limited to the benefits described herein. A particular implementation of the invention may provide all, some, or none of the benefits described herein. Although operations for the various techniques are described herein in a particular, sequential order for the sake of presentation, it should be understood that this manner of description encompasses rearrangements in the order of operations, unless a particular ordering is required. For example, operations described sequentially may in some cases be rearranged or performed concurrently. Techniques described herein with reference to flowcharts may be used with one or more of the systems described herein and/or with one or more other systems. Moreover, for the sake of simplicity, flowcharts may not show the various ways in which particular techniques can be used in conjunction with other techniques.

I. Exemplary Computing Environment

FIG. 1 illustrates a generalized example of a suitable computing environment (100) in which one or more of the described embodiments may be implemented. For example, one or more such computing environments can be used for managed environment update selection. Generally, various different general purpose or special purpose computing system configurations can be used. Examples of well-known computing system configurations that may be suitable for use with the tools and techniques described herein include, but are not limited to, server farms and server clusters, personal computers, server computers, hand-held or laptop devices, multiprocessor systems, microprocessor-based systems, programmable consumer electronics, network PCs, minicomputers, mainframe computers, distributed computing environments that include any of the above systems or devices, and the like.

The computing environment (100) is not intended to suggest any limitation as to scope of use or functionality of the invention, as the present invention may be implemented in diverse general-purpose or special-purpose computing environments.

With reference to FIG. 1, the computing environment (100) includes at least one processing unit (110) and memory (120). In FIG. 1, this most basic configuration (130) is included within a dashed line. The processing unit (110) executes computer-executable instructions and may be a real or a virtual processor. In a multi-processing system, multiple processing units execute computer-executable instructions to increase processing power. The memory (120) may be volatile memory (e.g., registers, cache, RAM), non-volatile memory (e.g., ROM, EEPROM, flash memory), or some combination of the two. The memory (120) stores software (180) implementing managed environment update selection.

Although the various blocks of FIG. 1 are shown with lines for the sake of clarity, in reality, delineating various components is not so clear and, metaphorically, the lines of this and the other figures would more accurately be grey and fuzzy. For example, one may consider a presentation component such as a display device to be an I/O component. Also, processors have memory. The inventors hereof recognize that such is the nature of the art and reiterate that the diagram of FIG. 1 is merely illustrative of an exemplary computing device that can be used in connection with one or more embodiments of the present invention. Distinction is not made between such categories as "workstation," "server," "laptop," "handheld device," etc., as all are contemplated within the scope of FIG. 1 and reference to "computer," "computing environment," or "computing device."

A computing environment (100) may have additional features. In FIG. 1, the computing environment (100) includes storage (140), one or more input devices (150), one or more output devices (160), and one or more communication connections (170). An interconnection mechanism (not shown) such as a bus, controller, or network interconnects the components of the computing environment (100). Typically, operating system software (not shown) provides an operating environment for other software executing in the computing environment (100), and coordinates activities of the components of the computing environment (100).

The storage (140) may be removable or non-removable, and may include magnetic disks, magnetic tapes or cassettes, CD-ROMs, CD-RWs, DVDs, or any other medium which can be used to store information and which can be accessed within the computing environment (100). The storage (140) stores instructions for the software (180).

The input device(s) (150) may be a touch input device such as a keyboard, mouse, pen, or trackball; a voice input device; a scanning device; a network adapter; a CD/DVD reader; or another device that provides input to the computing environment (100). The output device(s) (160) may be a display, printer, speaker, CD/DVD-writer, network adapter, or another device that provides output from the computing environment (100).

The communication connection(s) (170) enable communication over a communication medium to another computing entity. Thus, the computing environment (100) may operate in a networked environment using logical connections to one or more remote computing devices, such as a personal computer, a server, a router, a network PC, a peer device or another common network node. For example, the computing environment (100) may operate in a managed environment such as the environments described below with reference to FIGS. 2-3. The communication medium conveys information such as data or computer-executable instructions or requests in a modulated data signal. A modulated data signal is a signal that has one or more of its characteristics set or changed in such a manner as to encode information in the signal. By way of example, and not limitation, communication media include wired or wireless techniques implemented with an electrical, optical, RF, infrared, acoustic, or other carrier.

The tools and techniques can be described in the general context of computer-readable media. Computer-readable media are any available media that can be accessed within a computing environment. By way of example, and not limitation, with the computing environment (100), computer-readable media include memory (120), storage (140), and combinations of the above.

The tools and techniques can be described in the general context of computer-executable instructions, such as those included in program modules, being executed in a computing environment on a target real or virtual processor. Generally, program modules include routines, programs, libraries, objects, classes, components, data structures, etc. that perform particular tasks or implement particular abstract data types. The functionality of the program modules may be combined or split between program modules as desired in various embodiments. Computer-executable instructions for program modules may be executed within a local or distributed computing environment. In a distributed computing environment, program modules may be located in both local and remote computer storage media.

For the sake of presentation, the detailed description uses terms like "determine," "choose," "select," "transmit," "adjust," and "operate" to describe computer operations in a computing environment. These and other similar terms are high-level abstractions for operations performed by a computer, and should not be confused with acts performed by a human being, unless performance of an act by a human being (such as a "user") is explicitly noted. The actual computer operations corresponding to these terms vary depending on the implementation.

II. Update Selection Managed Environment

A. Managed Environment Overview

Figure 2:
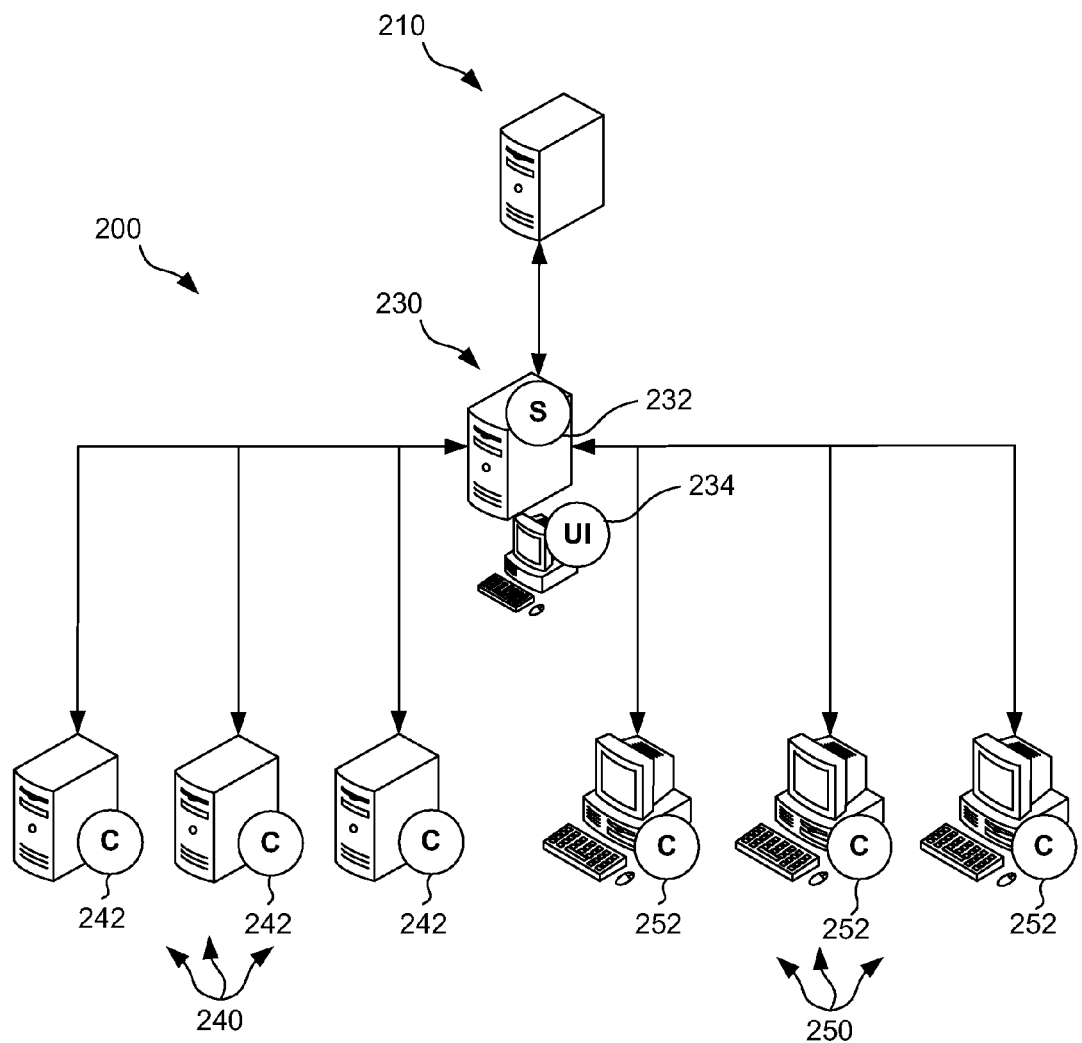
FIG. 2 is schematic diagram of a managed software updating environment.

FIG. 2 is a block diagram of an update selection managed environment (200) in conjunction with which one or more of the described embodiments may be implemented. The managed environment (200) can communicate with an update source (210) to obtain software updates for the managed environment (200). Specifically, the managed environment (200) can include a managing machine (230) that can communicate with the update source (210) to obtain updates, and then distribute the updates to the machines in the managed environment (200). Those updates can include updates for software on the managing machine (230), in addition to updates for other machines in the managed environment (200).

Alternatively, the managed environment (200) can include multiple managing machines. For example, multiple managing machines can perform the same functions in parallel to decrease the workload on any particular machine. As another example, different functions of the managing machine (230) can be split between multiple managing machines.

The managing machine (230) can include an update selection server component (232) and a user interface component (234), in addition to other components. The server component (232) can aggregate update selection information for the managed environment (200) and select corresponding update categories to be requested from the update source (210).

The user interface component can allow a user to specify whether to manually select updates to download or let the system automatically select updates for the managed environment (200). If a user chooses the automatic setting, automatic selection of updates, as described herein, can be enabled. If the automatic setting is not selected, then automatic update selection can be disabled. If so, then the user interface component (234) can allow traditional manual selection of software products to update in the managed environment.

The managed environment (200) can also include one or more managed machines (240) that can operate as servers, such as fileservers, database servers, etc. Each of those server managed machines (240) can include an update selection client component (242), which can obtain software update selection information for the managed machine (240). Each update selection client component (242) can also send the software update selection information to the update selection server component (232) in the managing machine (230), where it can be aggregated with software update selection information from other machines in the environment (200).

Referring still to FIG. 2, the managed environment (200) can also include one or more client managed machines (250), such as client machines in one or more client-server networks and/or peer machines in one or more peer-to-peer networks. Each of those client managed machines (250) can include an update selection client component (252), which can obtain update selection information for the managed machine (250) and send the update selection information to the update selection server component (232) in the managing machine (230).

As noted above, the server component (232) of the managing machine (230) can receive update selection information for the managed environment (200). That update selection information can include the update selection information from the client components (242 and 252) in the managed machines (240 and 250), and it can also include update selection information corresponding to software products installed on the managing machine (230). The update selection server component (232) can aggregate the update selection information and use it to make software update selections corresponding to software installed in the managed environment (200).

B. Managed Environment Transmissions

Figure 3:
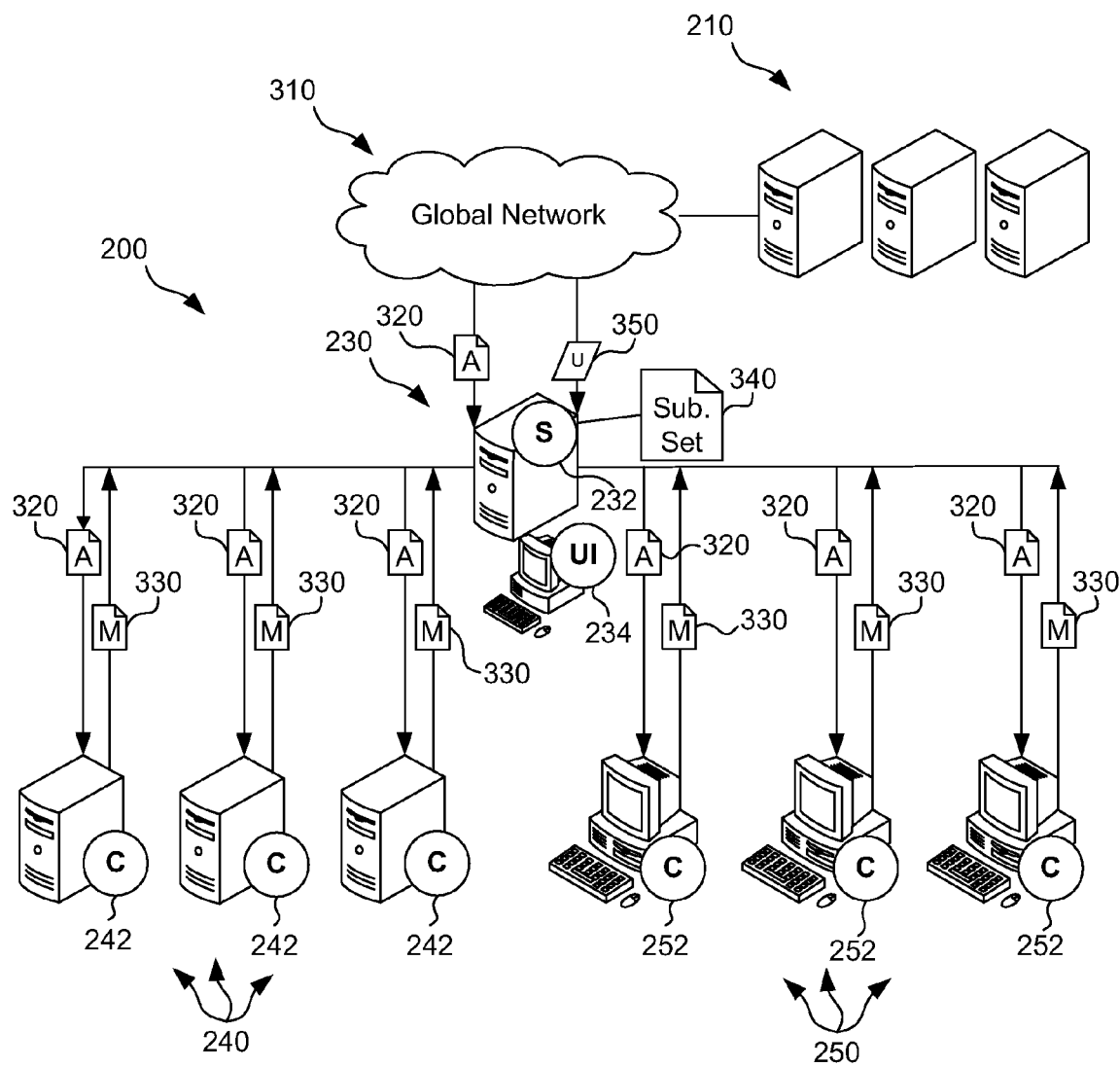
FIG. 3 is a schematic diagram of a managed software updating environment, illustrating some transmissions into and within the environment.

Referring to FIG. 3, particular embodiments of some transmissions into and within the managed environment (200) will be described. It should be understood that transmitted and/or stored data or documents (e.g., inventories of available updates, manifests with update selection information, subscription sets with update selection information, and software updates) may each be various different formats, such as in one or many files, depending on the embodiment. In addition, the transmissions may be initiated using different transmission techniques, such as typical push (with the sender initiating the transmission) or pull (with the receiver initiating the transmission) techniques. The transmissions may be executed using conventional transmission technology, including conventional transmission protocols, transmission devices, etc.

As is depicted by the cloud illustration between the managing machine (230) and the update source (210), communications between the managing machine (230) and the update source (210) can be transmitted via a global computer network (310), such as the Internet. For example, the managing machine (230) can receive an inventory (320), which can include indications of available software updates, from the update source (210) via the global computer network (310). The server component (232) of the managing machine (230) can pass that inventory (320) of available software updates on to the client component (242 and 252) of each of the managed machines (240 and 250). Each managed machine (240 and 250) can conduct an interrogation to determine what installed software on the managed machine (240 and 250) can be updated by corresponding update categories indicated by the inventory (320).

Each client component (242 and 252) of a managed machine (240 and 250) can send a machine update manifest (330) to the managing machine (230). The update manifest (330) can include update selection information, such as indications of which of the software update categories from the inventory (320) of available updates apply to software installed on the managed machine (240 and 250).

The managing machine (230) can also conduct an interrogation of its own software and maintain a machine update manifest (330) for the managing machine (230), such as by using scripts like those discussed below with reference to the managing machines. Alternatively, the managing machine (230) may select updates for itself in some other manner that is separate from the selection of updates for the managed machines (240 and 250).

The managing machine (230) can aggregate the update selection information from the machine update manifests (330) and generate an aggregated subscription set (340). This aggregation can include eliminating duplicate update selection information, such as duplicate indications of an update category. The aggregated subscription set (340) can thus include the update selection information for the managed machines (240 and 250) in the managed environment, and possibly the update selection information for the managing machine (230) as well. Aggregation and creation of the aggregated subscription set (340) can be done by the server component (232). Alternatively, the aggregation and creation could be done by different components, and it could even be done by different machines.

Referring still to FIG. 3, the managing machine (230) can use the aggregated subscription set (340) to request from the update source (210) updates represented by the update selection information in the aggregated subscription set (340). Accordingly, instead of requesting all the available updates indicated in the inventory (320), the managing machine (230) can request those update categories that apply to software products installed in the managed environment (200), and can exclude from the request categories that do not apply to installed software products. In response to this request (which could be in the form of one or multiple requests), the update source (210) can transmit the requested updates (350) to the managing machine (230) in a conventional manner, such as a standard synchronization technique of Windows® Server Update Services software and Microsoft Update software source. The received updates (350) can be distributed within the managed environment (200) using conventional techniques. For example, the updates (350) can be distributed using available IT management software, such as Windows® Server Update Services software.

C. Managing and Managed Machine Components

Figure 4:
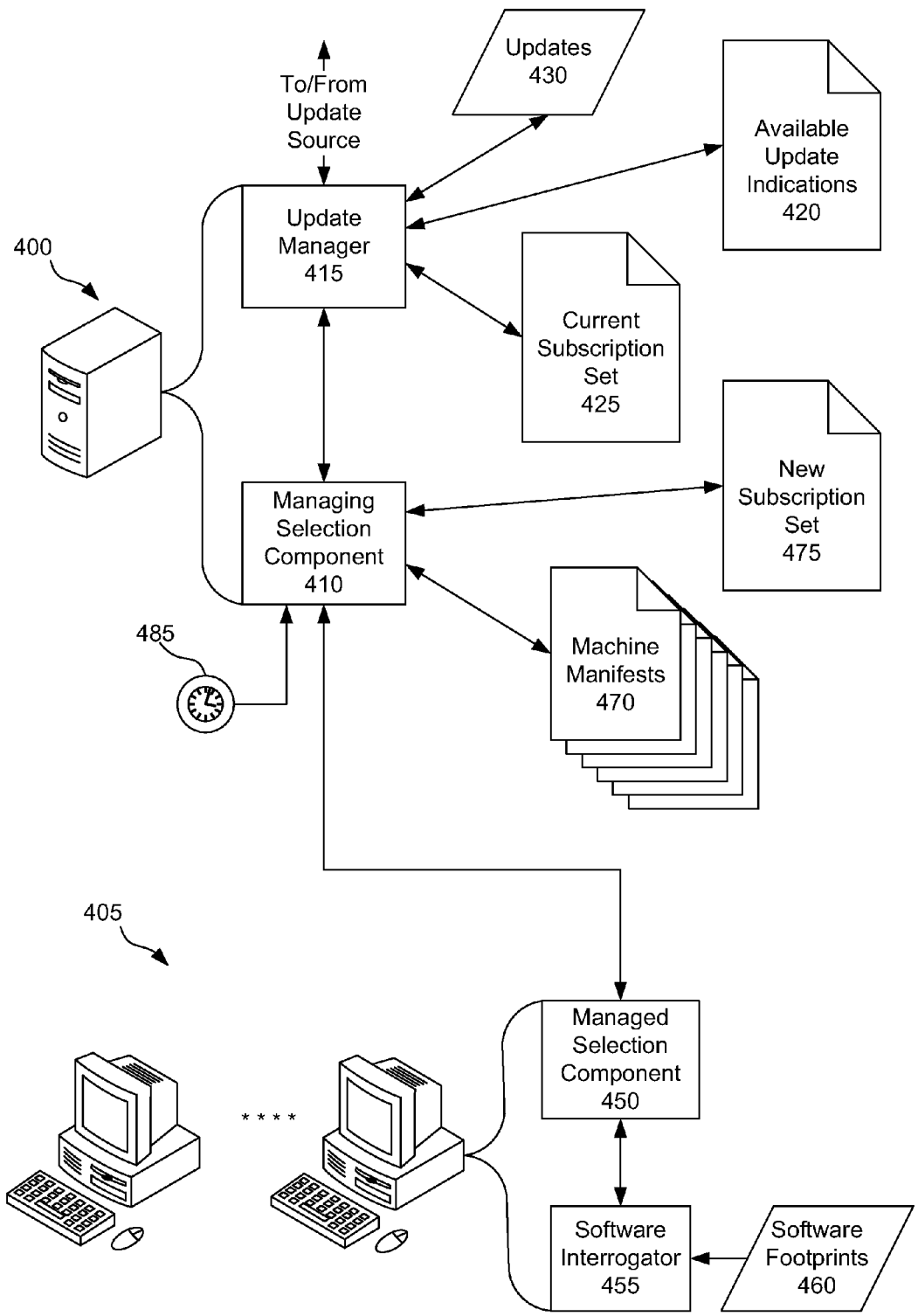
FIG. 4 is a schematic diagram of a managing machine and a managed machine in a managed software updating environment.

Referring now to FIG. 4, some components of a managing machine (400) and a managed machine (405) will be described. The managing machine (400) can include a managing selection component (410). The managing selection component (410) can communicate with an update manager (415). For example, the managing selection component (410) can be part of a management server software product, such as Microsoft System Essentials management software. The update manager (415) can be existing update management software that can be executed to obtain updates from an update source and distribute them in a managed environment. For example, the update manager (415) can be Windows® Server Update Services server software.

1. The Update Manager

The update manager (415) can receive available update indications (420) from the update source, and can pass those indications (420) on to the managing selection component (410) to be further passed on to the managed machines (405). The available update indications (420) indicate update subscription items, such as available update categories, which are available from an update source. The available update categories can correspond to software updates for software products, particular versions of software products, groups of software products, or groups of software product versions. The indications can include identifiers such as GUIDs (globally unique identifiers, which may not be guaranteed to be entirely unique) that correspond to update categories.

The update manager (415) can also access and modify a current subscription set (425). The current subscription set (425) can include a set of indications of update items available from the update source and to which the update manager (415) is currently subscribing. The indicated update items can be indicated by settings, which can be set by a user in some situations (such as when manual selection of updates is chosen by a user), but they can also be set by the managing selection component (410) through one or more programming interfaces, as discussed in more detail below. The update manager (415) can automatically (such as periodically) or manually be prompted to synchronize the update subscription items indicated in the current subscription set (425) with the update source, and can receive the most recent corresponding updates (430) from the update source if those updates (430) have not already been received.

2. Managed Machine Components

Referring still to FIG. 4, some components of a managed machine (405) will be described. The managing selection component (410) can prompt discovery tasks on the managed machines (405) and possibly on the managing machine (400). This prompting can result in the corresponding managed machines (405) and possibly the managing machine (400) producing machine manifests (470), as discussed in more detail below.

Each managed machine (405) can operate in a managed environment similar to the managed environment (200) of FIGS. 2-3, or in some other managed environment. The managed machine (405) can operate as a server, a client, and/or a peer computer in one or more computer networks.

The managed machine (405) can include a managed selection component (450), which can communicate with the managing selection component (410) in the managing machine (400). The managed selection component (450) can also communicate with a software interrogator (455), which can also reside in the managed machine (405). The software interrogator (455) can access one or more software footprints (460), which can be indications of installed software products, software product versions, and/or groups of software products installed on the managed machine (405). For example, the software footprints can include identifiers such as GUIDs corresponding to each software product, product version, and/or group of software products that corresponds to an update category. These can be the same identifiers as are used by the software source to indicate available software updates in the available update indications (420). The software footprints can also include other indications.

The managed selection component (450) can be triggered by a communication from the managing selection component (410), such as a communication that is sent according to a schedule. This schedule could include placing a software discovery task in a queue at a specified time or period according the schedule, as will be discussed in more detail below when discussing the managing selection component (410) in more detail.

FIG. 5 illustrates an example of XML language (500) for prompting the managing machine (400) to run the discovery of update items in a System Center Essentials managed environment using the System Center Operations Manager engine. Specifically, XML language of FIG. 5 can dictate that a script (such as a script including the script code of FIGS. 6-7) is to be run on machines being managed by System Center Essentials server software. The managed machines are specified as the "Target":

"Target=SC!Microsoft.SystemCenter.ManagedComputer."

The discovery script is to be entered in a queue to be run on the managed computers repeatedly at timed intervals, as indicated by the following language:

"TypeID='Windows!Microsoft.Windows.TimedScript. DiscoveryProvider.'" In the example of FIG. 5, the timed interval is 10800 seconds (3 hours), as indicated by the language, "<IntervalSeconds>10800</IntervalSeconds>." In addition, the script to be run on the managed machines is identified by name:

"<ScriptName>Microsoft.SystemCenter.AutoSelect.vbs</ScriptName>". The script "Microsoft.SystemCenter.AutoSelect.vbs" can include the VBScript code illustrated in FIGS. 6-7, which is to be run on the managed machines (405). There are many other ways to trigger the interrogation of the managed machines, including trigging the interrogation with timers or using some other technique on the managed machines (405).

The task of interrogating software on each managed machine (405) can include the managed selection component (450) making one or more application programming interface calls to the interrogator (455). The interrogator (455) can include one or more existing modules with the ability to take inventory of pertinent software products on the managed machine (405). For example, the interrogator (455) can include an existing discovery mechanism in System Center Operations Manager software, as well as a Microsoft Update Agent software component.

The managed selection component (450) can include one or more scripts running on each managed machine (405). For example, System Center Operations Manager software can be used to run the script(s) on all the managed machines (405). The available update indications (420) can be downloaded to each managed machine (405) from the managing machine (400) using standard transmission techniques, such as using the System Center Operations Manager client and server components. Thus, the managed selection component (450) can access the available update indications (420) to determine which indicated software selections from the available update indications (420) correspond to software installed on the managed machine (405).

A script can be run on each managed machine (405) to invoke a discovery mechanism to walk an existing software category "tree" on the managed machine (405), looking for category identifications corresponding to the identifications in the available update indications (420). When the script is run, the managed machine (405) can create discovery instances for each of the identifications in the category tree that match identifications in the available update indications (420). Those instances can include the update selection information, such as a corresponding identification for each of one or more discovered software products.

Referring to FIG. 6, an example of a discovery script portion (600) for walking a software category tree on a managed machine (405) is shown. The discovery script portion (600) can be run by itself or as part of a larger script, which may also include the search script portion discussed below with reference to FIG. 7. The script portion (600) can include error handling routines, variable definitions, etc. In addition, the script portion (600) can include a core call portion (610), which uses a Windows Update agent mechanism to walk the software category tree and return a discovery object for each identification that is found to match an identification in the available update indications (420). Thus, the returned discovery objects can indicate which of the available update selections indicated by the available update indications (420) are recognized as corresponding to software installed on the managed machine (405). The discovery objects can then be returned to the managing machine (400) as part of a machine manifest (470) using standard techniques, such as using the client and server components of System Center Operations Manager.

The managed selection component (450) can also include a script portion for calling an interrogation module to search and collect additional information about software installed on the managed machine (405). FIG. 7 illustrates an example of such a search script portion (700) in VBScript language, which can invoke a Windows® Update Agent software component on the managed machine (405) to search and return information about software installed on the machine, including information about updates to software programs and/or drivers. This information can also include the category identifications (such as GUIDs) corresponding to update categories. Thus, the search script portion (700) can be part of the managed selection component (450) of FIG. 4, and the Windows® Update Agent software component can be part of the software interrogator (455), which can be invoked by the managed selection component (450) to collect and return information regarding software installed on the managed machine (405). The results of the search script portion (700) can be returned to the managing machine (400).

The results of the search script portion (700) and the discovery objects returned from the discovery script portion (600) can be included as update selection information in a machine manifest (470) for the managed machine (405).

3. Managing Selection Component

Referring to FIG. 4, the managing selection component (410) can receive a machine manifest (470) for each managed machine (405), and possibly for the managing machine (400). In addition, the managing selection component (410) can maintain the machine manifests (470), and can aggregate the update selection information from the machine manifests (470) to produce a new subscription set (475).

The managing selection component (410) can interact with a clock (485) in the managing machine (400) to prompt discovery tasks according to one or more schedules, and to aggregate the update selection information according to a schedule. Each time the aggregation is performed, it can use the most recent machine manifest (470) for each machine in the managed environment. For example, the managing selection component (410) can enter a discovery task in a queue for each managed machine (405) periodically, such as every 51 minutes, every 53 minutes, every hour, every two hours, or every three hours. The managing selection component (410) can aggregate the update selection information from the machine manifests (470) periodically, such as every 51 minutes, every 53 minutes, every hour, every two hours, or every three hours, once per day, or twice per day. Alternatively, a schedule for aggregation or discovery can be done at random or quasi-random periods, or according to some other scheduling scheme.

Thus, the selection of updates for a managed environment, including obtaining and maintenance of the current subscription set (425) representing desired updates, can be performed automatically. The update manager (415) can also run in a standard manner to obtain updates from an update source and to distribute the updates throughout a managed environment, such as automatically according to a schedule.

Alternatively, schedules can be implemented in some other manner. For example, discovery tasks on managed machines (405) can be triggered by clocks on the managed machines (405), rather than being triggered by a clock (485) on the managing machine (400).

After the managing selection component (410) aggregates the update selection information from the machine manifests (470) to produce a new subscription set (475), the current subscription set (425) can be compared against the new subscription set (475). The managing selection component (410) can obtain the current subscription set from the update manager (415) or can access the current subscription set directly. If changes are found, as discussed more below, the new subscription set (475) can be submitted to the update manager (415) to replace the current subscription set (425). For example, if the update manager (415) is Windows® Server Update Services software, the new subscription set (475) can be transmitted to the update manager (415) by setting update categories through the ISubscription.SetUpdateCategories( ) application programming interface. The update manager (415) can be instructed to save the new subscription set (475) by calling ISubscription.Save( ). If no differences are found between the new subscription set (475) and the current subscription set (425), then the current subscription set (425) can remain unchanged.

This updating of the settings of the update manager (415) with a new subscription set (475) can be done following each update of the current aggregated subscription set (425). Thus, each time the aggregated subscription set (425) is updated, the settings of the update manager (415) can be set to obtain updates represented by the update selection information in the updated aggregated subscription set (425).

If the update manager (415) is busy and/or the current subscription set (425) is in use (e.g., because the update manager (415) is synchronizing with the update source) when the managing selection component (410) attempts to instruct the update manager (415) to save the new subscription set (475) to replace the current subscription set (425), then the new subscription set (475) may not be saved. If that happens, the managing selection component (410) can keep trying repeatedly (such as at preset or random intervals) until the update manager (415) and the current subscription set (425) are available. If the saving operation fails more than a prescribed number of times (such as twenty-five times), then an error message can be surfaced at a user interface to alert a user that a problem may exist.

As noted above, the managing selection component (410) can detect whether the new subscription set (475) has changes compared to the current subscription set (425). To do this, the managing selection component (410) can sort both the existing and updated subscription sets (425 and 475) and compare the elements of the subscription sets (425 and 475). For example, the managing selection component (410) can sort update category instances by their identifiers (e.g., GUIDs) and then compare the resulting sorted identifiers.

If no managed machines (405) have reported with machine manifests (470) at the time of aggregation, the managing selection component (410) can set the update manager (415) to retrieve only update categories corresponding to software installed on the managing machine (400). For example, the categories may correspond to operating system and management software products installed on the managing machine (400).

Using the tools and techniques described above, updates for a managed environment can be selected automatically, and those updates can be limited to those that apply to software installed in the managed environment. This can be done with little or no input needed from a user and without overloading the managed environment with updates that do not apply to the managed environment.

III. Managed Environment Update Selection Techniques

Figure 8:
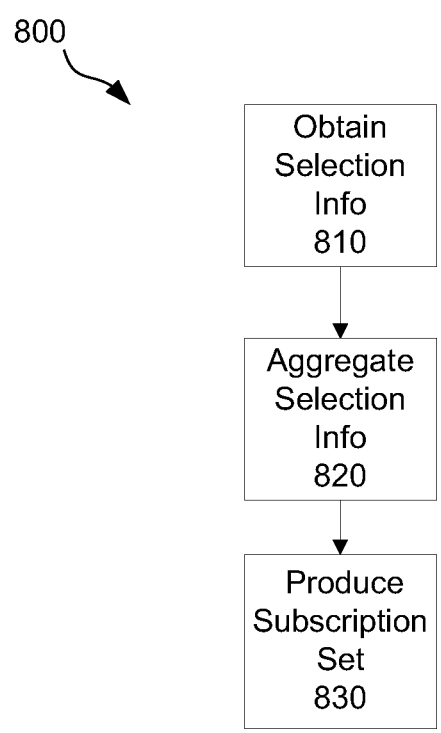
FIG. 8 is a flowchart illustrating a technique for selecting software updates in a managed software updating environment.

Referring now to FIG. 8, a general managed environment update selection technique (800) will be described. This and other techniques described below may be performed in a managed environment using managing and managed machines such as those described above, or in some other type of managed environment.

The selection technique (800) can include obtaining (810) update selection information for one or more machines in the managed environment, such as one or more managing machines and one or more managed machines. The update selection information can be aggregated (820) to produce (830) a subscription set for the managed environment.

Figure 9:
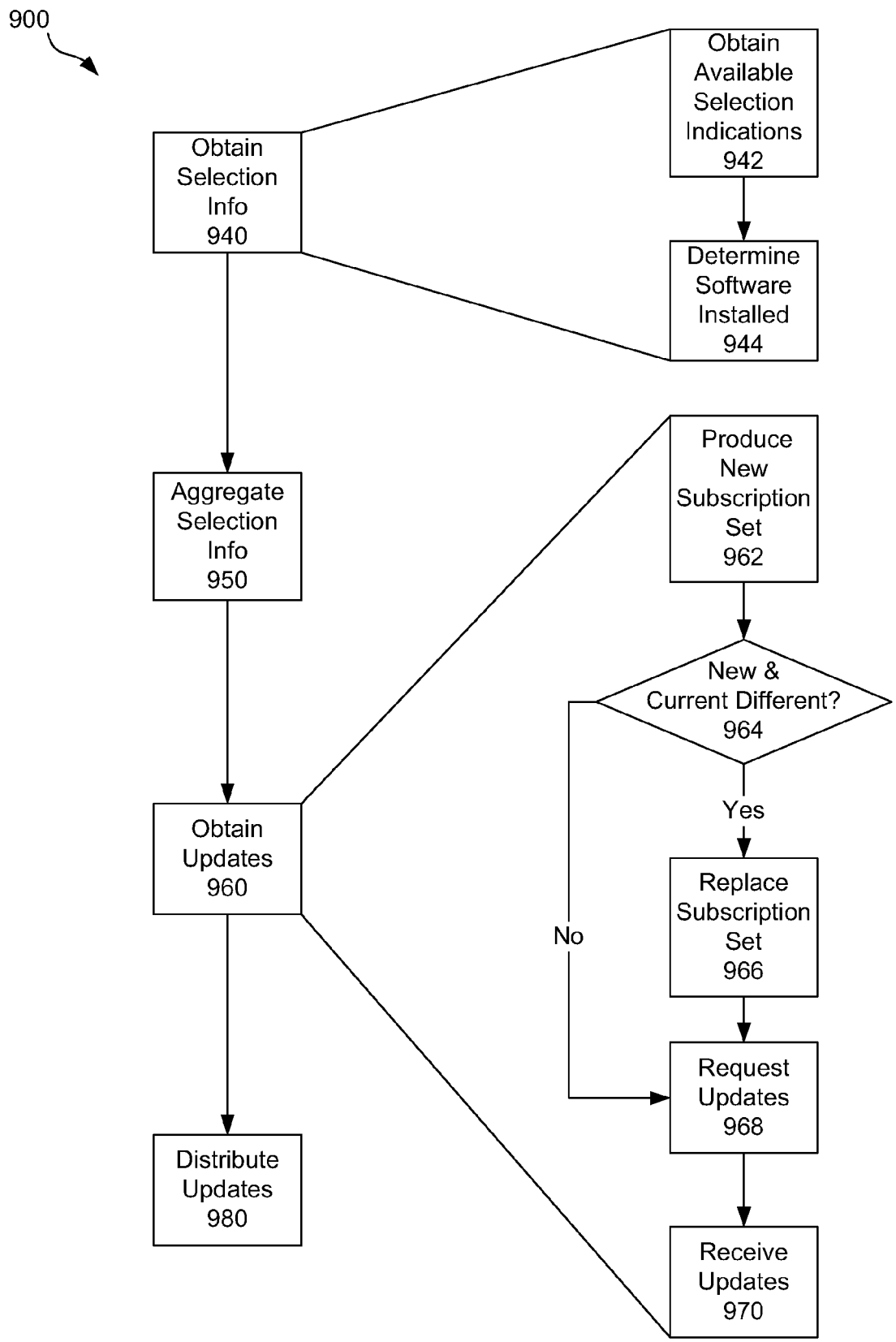
FIG. 9 is a flowchart illustrating a technique for selecting, obtaining, and distributing software updates in a managed software updating environment.

Referring to FIG. 9, a more specific technique (900) for selecting, obtaining, and distributing updates will be described. The technique (900) can include obtaining (940) software update selection information for one or more machines in a managed environment. Obtaining (940) the selection information can include obtaining (942) available software update selection indications, such as indications of available software update categories from a software update source. It can then be determined (944) whether software corresponding to each of the indicated update selections is installed on the machine(s) in the managed environment.

After the update selection information is obtained (940) from the machines, the selection information for the machines can be aggregated (950). The aggregated update selection information can be used to obtain (960) pertinent updates for the managed environment.

Obtaining (960) the pertinent updates can include producing (962) a new aggregated subscription set for the managed environment. It can then be determined (964) whether the new subscription set is different from a current subscription set. If so, then the current subscription set can be replaced (966) with the new subscription set. If not, then the replacement (966) can be skipped. Updates for the managed environment can be requested (968) and received (970) in a standard manner, such as by using synchronization between Windows® Server Update Services software and Microsoft Update software update source.

Obtained updates can be distributed (980) to machines in the managed environment in a standard manner, such as by using Windows® Server Update Services software.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

We claim:

1. A computer-implemented method comprising:
   for each of multiple machines in a managed environment, obtaining software update selection information representing selections of software updates corresponding to software installed on the machine;
   aggregating the software update selection information for the machines to produce aggregated software update selection information, aggregating comprising eliminating one or more duplicate software update selections in the software update selection information, the one or more duplicate software update selections occurring where the update selection information for two or more of the machines overlaps; and
   using the aggregated software update selection information to produce a subscription set of software update selections corresponding to software to update on the machines, the subscription set excluding available software update selections that do not correspond to software installed on the machines.

2. The method of claim 1, wherein the software update selection information for each machine comprises one or more indications of one or more software updates installed on the machine.

3. The method of claim 1, wherein the method is performed automatically and repeatedly.

4. The method of claim 1, wherein the multiple machines are multiple managed machines and obtaining software update selection information comprises, for each of the multiple managed machines, transmitting one or more software selection indications from the managed machine to a managing machine.

5. The method of claim 1, further comprising obtaining available updates corresponding to the software update selections of the subscription set.

6. The method of claim 5, wherein obtaining available updates comprises receiving the available updates at a managing machine that manages the machines in the managed environment.

7. The method of claim 1, wherein the machines are managed machines and obtaining software update selection information for each managed machine comprises:
   obtaining indications of available software update selections;
   for each of the available software update selections, determining whether software corresponding to the available software update selections is installed on the managed machine; and
   transmitting from the managed machine to a managing machine one or more indications of which of the available software update selections corresponds to software installed on the managed machine.

8. The method of claim 1, wherein obtaining the software update selection information for each machine comprises periodically obtaining the software update selection information for each machine, and wherein aggregating the software update selection information comprises periodically aggregating the software update selection information.

9. A managed computing environment comprising:
   at least one processor; and
   memory comprising instructions stored thereon that when executed by at least one processor cause at least one processor to perform acts comprising:
      producing managed machine software update selection indications for each of a plurality of managed machines in the managed environment, the software update selection indications for each managed machine indicating software update selections corresponding to software installed on the managed machine;

aggregating the managed machine software update selection indications for the plurality of managed machines to produce aggregated software update selection indications; and repeatedly using the aggregated software update selection indications to request available updates corresponding to the aggregated software update selection indications.

10. The computing environment of claim 9, wherein aggregating and using the aggregated software update selection indications are performed by a managing machine in the managed computing environment.

11. The computing environment of claim 9, wherein aggregating comprises periodically aggregating according to a schedule.

12. The computing environment of claim 9, wherein producing managed machine software update selection indications comprises periodically producing managed machine software update selection indications and sending the managed machine software update selection indications to a managing machine.

13. The computing environment of claim 9, wherein the acts further comprise obtaining and distributing the available updates corresponding to the aggregated software update selection indications.

14. The computing environment of claim 9, wherein producing managed machine software update selection indications comprises receiving from a managing machine indications of available software update selections and identifying installed software on each managed machine corresponding to the available software update selections.

15. One or more computer-readable storage media having computer-executable instructions embodied thereon that, when executed, perform acts comprising:

on each of a plurality of machines in a managed environment, identifying one or more software products installed on the machine that correspond to one or more software update selections, and producing one or more indications of the software update selections, the software update selections comprising selections of categories of updates corresponding to the software products;

aggregating the software update selections for all of the machines; and repeatedly obtaining available software updates corresponding to the software update selections.

16. The one or more computer-readable media of claim 15, wherein the one or more indications of the software update selections indicate one or more updated versions of one or more software products installed on the machine.

17. The one or more computer-readable media of claim 15, wherein the acts further comprise producing a subscription set of software update selections including the software update selections for each of the machines, the subscription set excluding software update selections not corresponding to software installed on the machines.

18. The one or more computer-readable media of claim 16, wherein obtaining the available software updates comprises obtaining a set of available updates that includes updates corresponding to the identified software products installed on the machines, and that excludes available updates that do not correspond to the identified software products installed on the machines.

19. The one or more computer-readable media of claim 15, wherein identifying one or more software products installed on the machine and aggregating the software update selections are performed automatically.

20. The one or more computer-readable media of claim 15, wherein identifying the one or more software products installed on the machine comprises periodically identifying the one or more software products installed on the machine according to a schedule.

* * * * *